N. B. BRALY.

CANVAS HOSE COUPLING.

APPLICATION FILED JULY 29, 1918.

Reissued Dec. 10, 1918. 14,563.

Inventor,

Norman B. Braly.

By

R. H. Fisher

UNITED STATES PATENT OFFICE.

NORMAN BLYTHE BRALY, OF BUTTE, MONTANA.

CANVAS HOSE-COUPLING.

14,563. Specification of Reissued Letters Patent. Reissued Dec. 10, 1918.

Original No. 1,211,067, dated January 2, 1917, Serial No. 113,702, filed August 3, 1916. Application for reissue filed July 29, 1918. Serial No. 247,307.

*To all whom it may concern:*

Be it known that I, NORMAN B. BRALY, a citizen of the United States, residing at Butte, in the county of Silverbow and State of Montana, have invented certain new and useful Improvements in Canvas Hose-Couplings, of which the following is a specification.

This invention relates to hose couplings and particularly to a coupling for canvas hose used in mines, and has for an object the provision of an improved structure which is reversible and which may be quickly connected and disconnected at any time.

A still further object in view is to provide a coupling for air hose which includes in its construction slightly collapsing rings and a connecting sliding member, whereby the ring structure will always be maintained but may be increased or decreased in diameter as desired.

In the accompanying drawing:—

Referring to the accompanying drawing by numerals, 1 indicates the roof or top of the passageway into which suitable supporting members 2 are inserted for supporting a wire or cable 3 known as a messenger wire. The passageway, wire 3, and associated parts are in common use in mines and therefore form no part of the present invention, but the wire 3 is utilized for supporting the canvas hose 4. This hose is intended as a conduit for air which is supplied from time to time and whenever desired to any convenient point.

Figure 1:
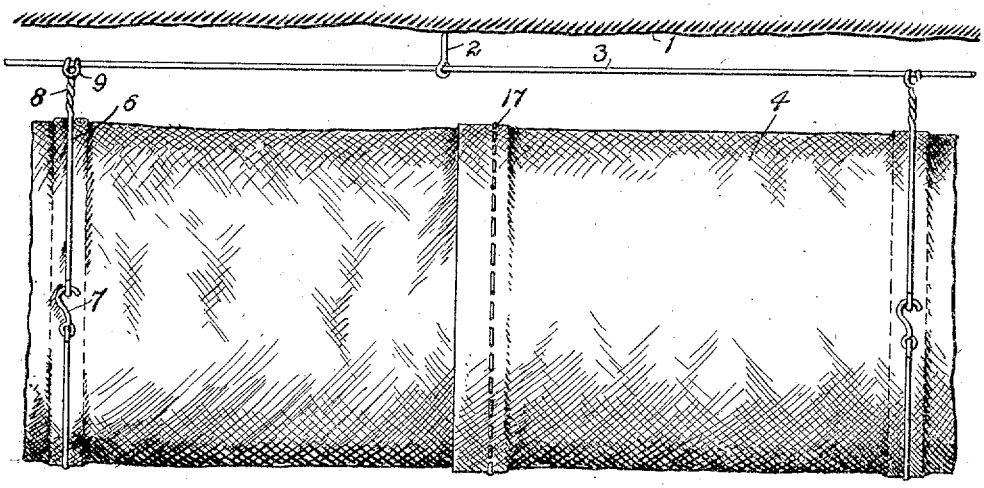
Figure 1 is a side view of a canvas hose with an embodiment of the invention applied thereto, the various parts being shown in use.
Figure 2:
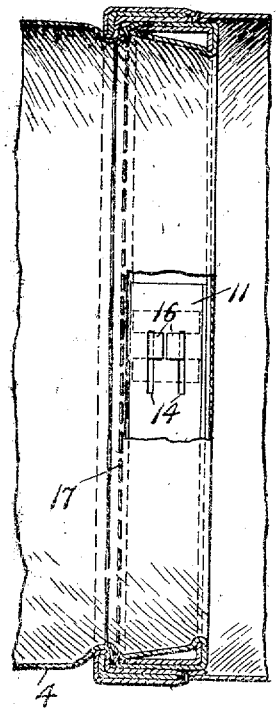
Fig. 2 is a longitudinal vertical section through the associated ends of two hose sections and the coupling connecting the same.
Figure 3:
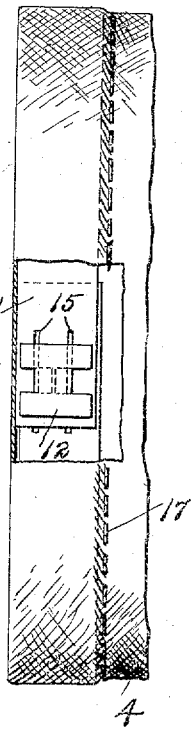
Fig. 3 is a plan view of the end of one of the hose sections with a certain part broken away for better illustrating certain of the detail features.
Figure 4:
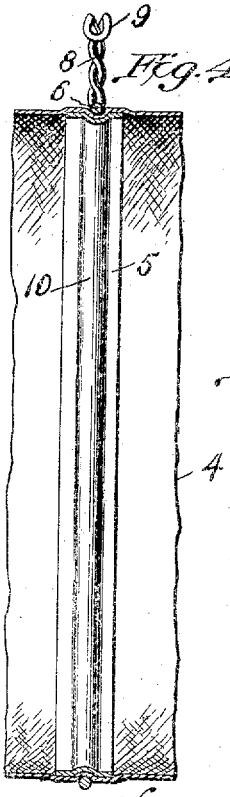
Fig. 4 is a sectional view through part of one of the hose sections showing a spreading and supporting ring embodying certain features of the invention.
Figure 5:
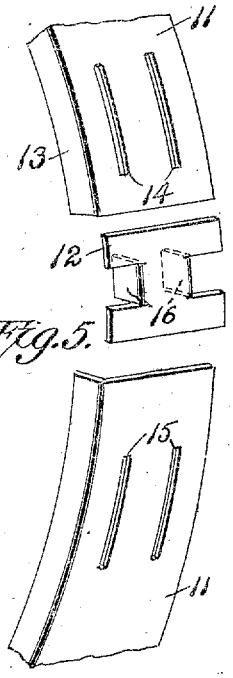
Fig. 5 is a fragmentary detail perspective view of the ends of one of the coupling rings separated and the fastening means therefor.

The hose 4 is made into a number of sections, each section having terminal couplers embodying the invention and being also provided between its ends with supporting and spreading means, the latter comprising an inner ring 5 and an outer wire or rod 6 held together at a suitable point by a hook and eye structure 7. The upper end of the wire is twisted at 8 and bent at 9 which hooks over the messenger wire 3 for properly supporting the canvas hose out of the way. It will be observed that the ring 5 is provided with an inwardly extending bead 10 whereby an outer peripheral groove is presented into which part of the canvas is forced, as shown in Fig. 4, by the wire 6, so that the ring is always held in proper position for spreading the canvas and also for supporting the wire 6. The terminal coupling elements, as shown more particularly in Figs. 2 and 5, are each formed from a metal ring 11 and a connecting plate 12. The ring 11 is provided with a turned-in flange 13 and is divided or cut at one point so that the ends slidably overlap, as shown in Figs. 2 and 3. The overlapped ends of the ring 11 are provided with slots 14 and also slots 15. Offset tongue members 16 of the connecting plate 12 project through these slots, as shown in Fig. 2, and are bent over though arranged to loosely inclose part of the ring 11 between the slots. This will allow the ends of the ring to slide over each other and move back and forth for varying the diameter of the ring in order that the ring on the end of one section of hose may be inserted into the other.

It will be noted that either end of any section may be either inserted into the end of the next adjacent section or over the end of the next adjacent section and the parts properly interlocked. The ends of the section of canvas are passed over the rings and are stitched in place by line of stitching 17 for each ring, the rings being arranged so that the flange 13 will be at the end. The rings 11 are made somewhat resilient so as to freely spread or become enlarged after having been contracted whereby the rings of adjacent sections will interlock and form a complete coupler amply strong to hold the sections of the hose together.

In mining operations, after the mine has been sunk a predetermined distance, air must be supplied to the workmen by some means which heretofore has usually been metallic pipes discharging at convenient points near the workmen, the foul air or gases being allowed either to ascend by reason of their nature or by reason of suction pipes properly distributed. The use of metal pipes for this purpose in temporary galleries and other temporary parts of the mine, or where new passageways are being formed, is more or less expensive and therefore undesirable. The coupling embodying the invention makes the use of canvas hose very acceptable in places of the kind just described, as the hose may be quickly and easily arranged in position by a minimum number of workmen. Preferably the hose is suspended by hook 9, though this is not essential, as the hose may be laid on the floor or on any suitable system of projections, as the hose will readily conform to the shape of the passageway, which is not true of metal pipes unless a large amount of work is performed thereon.

Additionally, it may be explained that the particular coupling above described has other advantageous features. It will be noted by reference to Fig. 2 that the rings are arranged one inside the other, and that they are in substantially parallel relation. The inturned flange of the outer ring constitutes an abutment or stop which prevents the inner ring from sliding outwardly, and thus preventing the accidental separation of the sections under longitudinal strain. With this particular arrangement, it will be evident that the rings constitute reinforcements for each other, and the inner ring cannot sag so that its upper edge will disengage the upper portion of the flange of the outer ring. Thus, a serious objection is overcome to a coupling of this kind, in which one ring lies behind the other, and consequently depends for the maintenance of an alined relation upon the support given by the flexible fabric. In the latter instance, the fabric is apt to sag, so that the inner ring at one point may escape the corresponding portion of the outer ring and the sections will then readily pull apart.

Having thus fully described my invention, what I claim as new, and desire to secure by Letters Patent, is:—

1. A hose coupling comprising a coupling ring formed with an inwardly extending flange, said ring being cut or divided at one point so that the ends may overlap, and means for slidingly holding said ends in position, the ring connected with one section of hose being capable of insertion into the next adjacent section of hose.

2. In a hose coupling of the character described, the combination of a canvas hose divided into sections, a resilient metallic ring arranged at each end of each of said sections, said rings being cut at one point in order to overlap, a pair of slots in each of the overlapped portions or ends of said ring, said slots extending longitudinally of the rings, and a binding plate formed with a body fitting against the ring and with retaining extensions projecting through said slots and overlapping part of the material of the ring between the slots whereby the overlapped ends cannot become disengaged but may freely move longitudinally so as to vary the diameter of the ring.

3. A coupling for canvas hose comprising a ring divided at one point and overlapped at the divided point, said overlapped sections having each a pair of longitudinally arranged slots, and a clip having arms extending through said slots for preventing disengagement of the overlapping sections while allowing a free longitudinal movement within limits, whereby the ring on the end of one section of hose may be forced into or from the ring of the next adjacent section.

4. In a coupling of the character set forth, the combination with expansible and contractile tubular coupling members capable of insertion one within the other, and stop means carried by one of the members and engaged by the other for holding the one inside the other in substantially parallel relation.

5. In a coupling of the character set forth, the combination with expansible and contractile coupling rings capal e of insertion one within the other, means for limiting the expansion and contraction of said rings, and stop means carried by one of the rings and engaged by the other for holding one inside the other in substantially parallel relation.

6. In a coupling of the character set forth, the combination with expansible and contractile coupling rings, either being capable of insertion and location inside the other with the two in substantially parallel relation, and means for normally maintaining them against separation in said associated relation.

7. In a coupling of the character set forth, the combination with expansible and contractile coupling rings, either being capable of insertion and location inside the other, with the two in substantially parallel relation, and each having an abutment flange against which the other is adapted to bear to maintain the rings in said associated relation, and means for restricting the amount of expansion and contraction of the rings.

8. In a coupling of the character set forth, the combination with hose sections of flexible fabric, of expansible and contractile coupling rings carried by the ends of the sections and adapted to be placed one inside the other in substantially parallel relation to couple the sections, and means for resisting the relative outward sliding movement of the rings when one is inside the other to maintain the sections in coupled relation.

9. In a coupling of the character set forth, the combination with hose sections of flexible fabric, of expansible and contractile coupling rings carried by the ends of the sections, either ring being adapted to be placed inside the other in substantially parallel relation to couple the sections, and abutments carried by each ring and adapted to be engaged by the other to resist the relative outward sliding movement of the rings when one is inside the other in order to maintain the sections in coupled relation.

10. In a coupling of the character set forth, the combination with hose sections of flexible fabric, of expansible and contractile coupling rings carried by the ends of the sections, either ring being adapted to be placed inside the other in substantially parallel relation thereto to couple the sections, and inturned abutment flanges carried by each ring and adapted to be borne against by the other to resist the relative outward sliding movements of the rings when one is inside the other in order to maintain the sections in coupled relation, the fabric being looped about and covering said rings.

11. A hose coupling including an expansible and contractile coupling ring formed with an abutment or stop flange that is disposed longitudinally of the body of said ring, and means for limiting the amount of expansion and contraction of said ring.

12. A hose coupling including an expansible and contractile coupling ring formed with an inwardly extending stop or abutment flange, and means carried by the ring for limiting the amount of expansion and contraction thereof.

In testimony whereof, I affix my signature in the presence of two witnesses.

NORMAN BLYTHE BRALY.

Witnesses:
R. M. De Peu,
H. A. Holp.